United States Patent
Goard et al.

(10) Patent No.: US 9,721,366 B2
(45) Date of Patent: Aug. 1, 2017

(54) DATA INTERPRETATION OVERLAY MECHANISM

(71) Applicant: International Business Machines Corporation, Armonk, NY (US)

(72) Inventors: Deanne S. Goard, Cordeaux Heights (AU); Anthony E. Martinez, Orcas, WA (US); Hersh Sahai, Edgecliff (AU)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/660,349

(22) Filed: Mar. 17, 2015

(65) Prior Publication Data
US 2016/0275661 A1  Sep. 22, 2016

(51) Int. Cl.
G09G 5/00 (2006.01)
G06T 11/20 (2006.01)

(52) U.S. Cl.
CPC .................. *G06T 11/206* (2013.01)

(58) Field of Classification Search
CPC ..... G06F 17/245; G06T 19/00; G06T 11/206; G09C 5/00
See application file for complete search history.

(56) References Cited

U.S. PATENT DOCUMENTS

| | | | |
|---|---|---|---|
| 8,549,439 B2 | 10/2013 | Howard | |
| 2007/0168154 A1* | 7/2007 | Ericson | G06K 9/6247 702/179 |
| 2011/0181597 A1 | 7/2011 | Cardno et al. | |
| 2014/0019492 A1 | 1/2014 | Woods et al. | |
| 2014/0192082 A1* | 7/2014 | Kragness | G06T 11/206 345/629 |
| 2014/0245126 A1 | 8/2014 | Sharma | |

OTHER PUBLICATIONS

Turner, "Data Visualization: Simple solutions for complex data", IBM Software Community, IBM Software Blog, Nov. 9, 2012, <https://www-304.ibm.com/connections/blogs/bcde08b8-816c-42a8-aa37-5f1ce02470a9/entry/simple_solutions_for_complex_data9?lang=en_us>.

Wunsche, "A Survey, Classification and Analysis of Perceptual Concepts and their Application for the Effective Visualisation of Complex Information", APVis '04 Proceedings of the 2004 Australasian symposium on Information Visualisation, vol. 35, pp. 17-24, Publication Date: Jan. 1, 2004, ISBN: 1-920682-17-1, <http://dl.acm.org/citation.cfm?id=1082104>.

* cited by examiner

*Primary Examiner* — Peter Hoang
(74) *Attorney, Agent, or Firm* — Maeve Carpenter

(57) ABSTRACT

In an approach to displaying data, one or more computer processors receive a plurality of coordinates of an overlay on a graphical data display, such that the plurality of coordinates indicate a position and a size of the overlay. The one or more computer processors retrieve one or more data points from the graphical data display. The one or more computer processors de-emphasize at least a portion of the one or more retrieved data points. The one or more computer processors display, in the overlay, one or more retrieved data points of the graphical data display that reside within the plurality of coordinates of the overlay.

17 Claims, 7 Drawing Sheets

DATA INTERPRETATION OVERLAY MECHANISM

BACKGROUND OF THE INVENTION

The present invention relates generally to the field of data processing, and more particularly to data display and interpretation via an overlay mechanism.

A chart or graph can be described as a type of information graphic or graphic organizer that represents tabular numeric data and/or functions. Charts are often used to make it easier to understand large quantities of data and the relationship between different parts of the data. Charts can typically be read more quickly than the raw data from which the graph is generated. Charts and graphs are used in a wide variety of fields, and can be created by hand (often on graph paper) or by computer using a charting application.

Data visualization involves the creation and study of the visual representation of data. A primary goal of data visualization is to communicate information clearly and efficiently to users via the information graphics selected, such as tables and graphs. Effective visualization helps users in analyzing and reasoning about data and evidence. It makes complex data more accessible, understandable, and usable. Users may have particular analytical tasks, such as making comparisons or understanding causality, and the design principle of the graphic (i.e., showing comparisons or showing causality) follows the task. Tables are generally used where users will look-up a specific measure of a variable, while charts of various types are used to show patterns or relationships in the data for one or more variables.

SUMMARY

Embodiments of the present invention disclose a method, a computer program product, and a system for displaying data. The method may include one or more computer processors receiving a plurality of coordinates of an overlay on a graphical data display, wherein the plurality of coordinates indicate a position and a size of the overlay. The one or more computer processors retrieve one or more data points from the graphical data display. The one or more computer processors de-emphasize at least a portion of the one or more retrieved data points. The one or more computer processors display, in the overlay, one or more retrieved data points of the graphical data display that reside within the plurality of coordinates of the overlay.

DETAILED DESCRIPTION

Information displays, such as data tables and graphs, can be highly complex and overwhelming to a user of a data analysis application. The more data points displayed on a graph, the more difficult the task of sifting through the data and creating an accurate assessment can be for the user. Embodiments of the present invention recognize that data analysis may be improved by implementing a data visualization mechanism that simplifies extracting information from complex information spaces. Implementation of embodiments of the invention may take a variety of forms, and exemplary implementation details are discussed subsequently with reference to the Figures.

Figure 1:
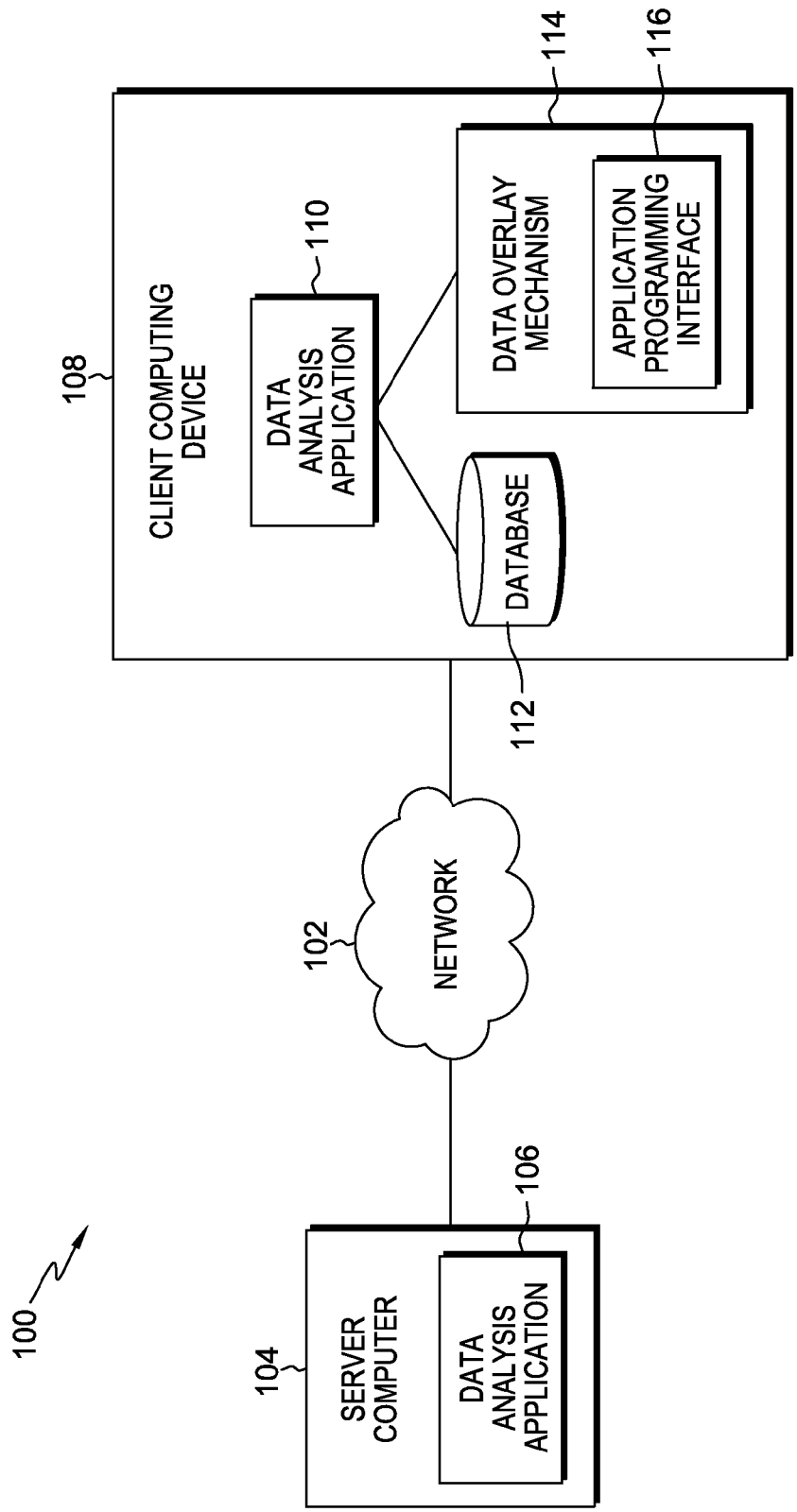
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 108, both interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 104, client computing device 108, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 108 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes data analysis application 106.

Client computing device 108 can be a desktop computer, a laptop computer, a tablet computer, a specialized computer server, a smart phone, or any programmable electronic device capable of communicating with various components and devices within distributed data processing environment 100, via network 102. In general, client computing device 108 represents any programmable electronic device or combination of programmable electronic devices capable of executing machine readable program instructions and communicating with server computer 104 and other computing devices (not shown) within distributed data processing environment 100 via a network, such as network 102. Client computing device 108 includes data analysis application 110, database 112, data overlay mechanism 114, and application programming interface (API) 116.

Data analysis application 106 and data analysis application 110 are each one of a plurality of applications known in the art as information graphics software for data visualization, i.e., analyzing and graphically displaying data. Examples of data analysis applications include spreadsheets and presentation software, as well as any software used to graph or analyze potentially large sets of numbers. In an embodiment where server computer 104 is a web server, data analysis application 106 can be a web application.

Database 112 resides on client computing device 108. In another embodiment, database 112 can reside on server computer 104 or elsewhere in the environment. A database is an organized collection of data. Database 112 can be implemented with any type of storage device capable of storing data and configuration files that can be accessed and utilized by client computing device 108, such as a database server, a hard disk drive, or a flash memory. In other embodiments, database 112 can represent multiple storage devices within client computing device 108. Database 112 stores data used by data analysis application 106 and data analysis application 110.

Data overlay mechanism 114 resides on client computing device 108. In another embodiment, data overlay mechanism 114 can reside elsewhere in the environment provided the mechanism can communicate with a data analysis application, such as data analysis application 106 or data analysis application 110. Data overlay mechanism 114 is a mechanism that aids a user in understanding and interpreting information. Data overlay mechanism 114 presents a data interpretation viewport, also known as a widget or lens, which appears to float on top of a potentially complex information space, such as a graph, and reveals insights about the data displayed underneath the widget. Data overlay mechanism 114 enables simplification of the information space. A user can manipulate data overlay mechanism 114 to show varying data points and also to further interpret or visualize the data points. In the depicted embodiment, data overlay mechanism 114 is a standalone mechanism that uses API 116 to interact with data analysis application 106, on server computer 104, and with data analysis application 110, on client computing device 108. In the embodiment, using API 116, data overlay mechanism 114 can control the display of data based on location and size coordinates of the widget. In another embodiment, data overlay mechanism 114 can be integrated within an application, such as data analysis application 106 or data analysis application 110 for manipulation by a user. Data overlay mechanism 114 is depicted and described in further detail with respect to FIG. 2.

API 116 provides an interface between data overlay mechanism 114 and data analysis applications, such as data analysis application 106 and data analysis application 110. An API is a particular set of rules and specifications that a software program can follow to access and make use of the services and resources provided by another particular software program that implements the API. An API serves as an interface between different software programs and facilitates their interaction. API 116 may inform a data analysis application, such as data analysis application 106 or data analysis application 110, of the presence of data overlay mechanism 114, as well as whether to de-emphasize data in the display. API 116 may also interface with data overlay mechanism 114 to determine what data the data analysis application displays.

Figure 2:
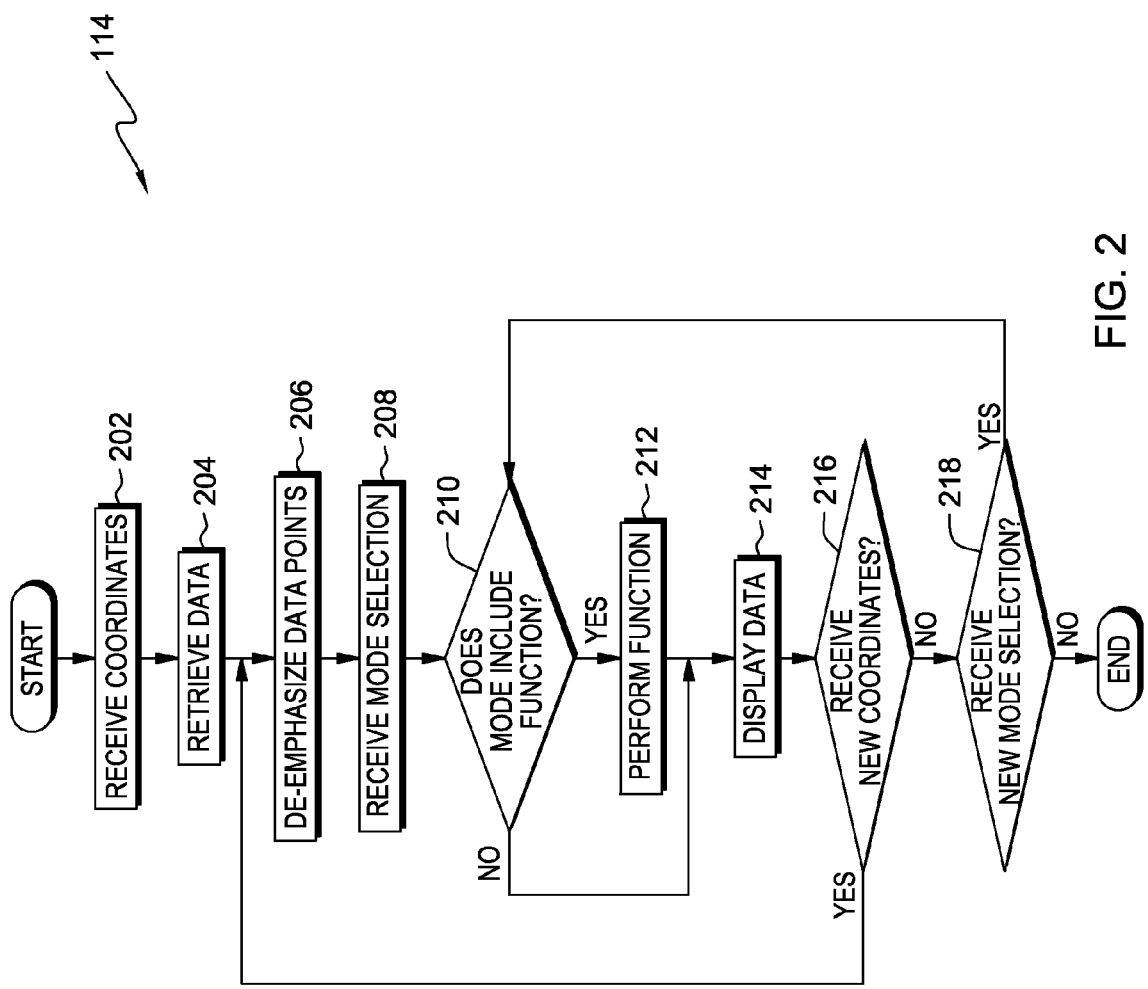
FIG. 2 is a flowchart depicting operational steps of a data overlay mechanism, on a client computing device within the distributed data processing environment of FIG. 1, for displaying and interpreting graphical data, in accordance with an embodiment of the present invention.

FIG. 2 is a flowchart depicting operational steps of data overlay mechanism 114, on client computing device 108 within distributed data processing environment 100 of FIG. 1, for displaying and interpreting graphical data, in accordance with an embodiment of the present invention.

Data overlay mechanism 114 receives coordinates (step 202). Prior to initializing data overlay mechanism 114, a user initializes a data analysis application, such as data analysis application 106 or data analysis application 110, and graphical data is displayed on a screen or other display device associated with client computing device 108. When either a user of client computing device 108 or a data analysis application initializes data overlay mechanism 114, the user can manipulate both the size and position of the widget displayed on the screen with the graphical data. The X-Y coordinates of the widget on the screen determine a portion of the graph with which data overlay mechanism 114 interacts. The width of the widget determines a number of "columns" of a graph with which data overlay mechanism 114 interacts, depending on the attributes of the graph on which the widget is overlaid. In one embodiment, a default exists for the size and position coordinates of the widget, and a user can alter the coordinates once the widget is displayed. A user can "stretch" and "shrink" the widget to change the range of data displayed by data overlay mechanism 114, as depicted with respect to FIGS. 3A-3D. Data overlay mechanism 114 receives the coordinates of both position and size from the user's placement of the widget on the screen. In one embodiment, data overlay mechanism 114 includes a toggle button with which the user can change the widget from overlaying a column of data to overlaying a row of data by rotating the widget ninety degrees. In an embodiment where client computing device 108 includes a touch screen, a user can change the size or position of the widget on the screen by swiping the screen with the user's fingers. In one embodiment, API 116 retrieves the coordinates of data overlay mechanism 114 upon initialization and communicates the coordinates to data analysis application 110.

Data overlay mechanism 114 retrieves data (step 204). Data overlay mechanism 114 retrieves the data from data analysis application 110. In another embodiment, data overlay mechanism 114 retrieves data from another data analysis application, such as data analysis application 106. The retrieved data is the full dataset that the data analysis application displays. For example, if data analysis application 110 displays a graph, then data overlay mechanism 114 retrieves all the data within the graph. In one embodiment, API 116 retrieves the data and passes it to data overlay mechanism 114.

Data overlay mechanism 114 de-emphasizes data points (step 206). Data overlay mechanism 114 de-emphasizes all the displayed data points except for the data points that reside in the area the widget overlays. In one embodiment, data overlay mechanism 114 dims the data points that the widget does not overlay such that the de-emphasized data remains visible to the user, but not distracting. In another embodiment, data overlay mechanism 114 removes the data points from the view of the graph. In one embodiment, data overlay mechanism 114 controls the display of the data directly and de-emphasizes the data points. In another embodiment, data overlay mechanism 114 instructs data analysis application 110 to de-emphasize the data points. In a further embodiment, API 116 instructs data analysis application 110 to de-emphasize the data points.

Data overlay mechanism 114 receives mode selection (step 208). Data overlay mechanism 114 can operate in a plurality of modes. In one embodiment, the default mode is "Reveal." When data overlay mechanism 114 is in Reveal mode, the mechanism reveals the data points that reside within the coordinates of the widget, i.e., the data points the widget overlays. Data overlay mechanism 114 includes one or more modes that include a mathematical function. For example, data overlay mechanism 114 may include a mode called "Average" which averages the data points that reside in the area overlaid by the widget. A user of client computing device 108 selects the desired mode. For example, data overlay mechanism 114 may include a dropdown box on the widget that the user can click on to choose a mode. Modes may appear in a list or a user can type in a mode. In another example, if data overlay mechanism 114 is integrated into the data analysis application, then the tool bar of the data analysis application can include a mode selection option. In one embodiment, API 116 receives the mode selection and passes the mode selection to data overlay mechanism 114.

Data overlay mechanism 114 determines whether the selected mode includes a function (decision block 210). As discussed with respect to step 208, data overlay mechanism 114 includes one or more modes that include a mathematical function. Examples of functions include arithmetic operations such as addition, subtraction, multiplication, and division, as well as more advanced operations such as average, sum, maximum, minimum, percentage, etc. In addition, data overlay mechanism 114 may include one or more functions that the data analysis application can perform, such as a formula or an algorithm. In one embodiment, API 116 determines whether the selected mode includes a function and informs data overlay mechanism 114.

If data overlay mechanism 114 determines the mode includes a function ("yes" branch, decision block 210), then the mechanism performs the function (step 212). If the user selected a mode with a function, then data overlay mechanism 114 performs the function on the data points that reside in the area within the coordinates of the widget. For example, if the selected mode is average and the widget overlays two columns of data in a graph, then data overlay mechanism 114 calculates the average of data points from the two columns that reside in a same row of the graph. In one embodiment, API 116 passes the data to be processed from data analysis application 110 to data overlay mechanism 114 and retrieves the processed data from data overlay mechanism 114 after the mechanism performs the function.

Responsive to performing the function, or if data overlay mechanism 114 determines the mode does not include a function ("no" branch, decision block 210), then the mechanism displays the data (step 214). In one embodiment, data overlay mechanism 114 displays the data that is passed to the mechanism from data analysis application 110. In another embodiment, data overlay mechanism 114 instructs data analysis application 110 to display the data. In a further embodiment, API 116 receives the data from data overlay mechanism 114 and instructs data analysis application 110 to display the data. Data overlay mechanism 114 displays the data points that reside in the area the widget overlays, whether they are the original retrieved data points or the data that results from performing a function on the original retrieved data points. In one embodiment, data overlay mechanism 114 may display the data in a manner that indicates to the user that additional functionality is available. For example, data overlay mechanism 114 may display a particular data point underlined within the view of the widget. The underline can indicate to a user that if the user clicks on the underlined data point displayed in the widget, then data overlay mechanism 114 can interact with the data analysis application to take the user to the origin of the data point within the data analysis file. For example, if the widget resides on top of a graph displayed in a spreadsheet, and data overlay mechanism 114 displays a data point with an underline, then the user can click on the data point, and the mechanism can jump to the cell where the raw data that makes up the graph resides. In another embodiment, data overlay mechanism 114 may display additional functionality by displaying a pop-up box or a dropdown box.

Responsive to displaying the data, data overlay mechanism 114 determines whether new coordinates are received (decision block 216). If a user manipulates the widget by moving the widget to a different position on the screen, or by stretching or shrinking the width of the widget, then data overlay mechanism 114 receives another set of coordinates. If data overlay mechanism 114 receives new coordinates ("yes" branch, decision block 216), then the mechanism returns to step 206 to de-emphasize a new set of data points.

If data overlay mechanism 114 does not receive new coordinates ("no" branch, decision block 216), then the mechanism determines whether a new mode selection is received (decision block 218). A user may perform one or more additional functions on selected data points while viewing a graph in order to perform an analysis. If data overlay mechanism 114 receives a new mode selection ("yes" branch, decision block 218), then the mechanism returns to step 210 to determine whether the new mode includes a function. If data overlay mechanism 114 does not receive a new mode selection ("no" branch, decision block 218), then the mechanism completes execution.

FIGS. 3A through 3D illustrate examples of data displayed using data overlay mechanism 114, on client computing device 108 within distributed data processing environment 100 of FIG. 1, in accordance with an embodiment of the present invention.

Figure 3A:
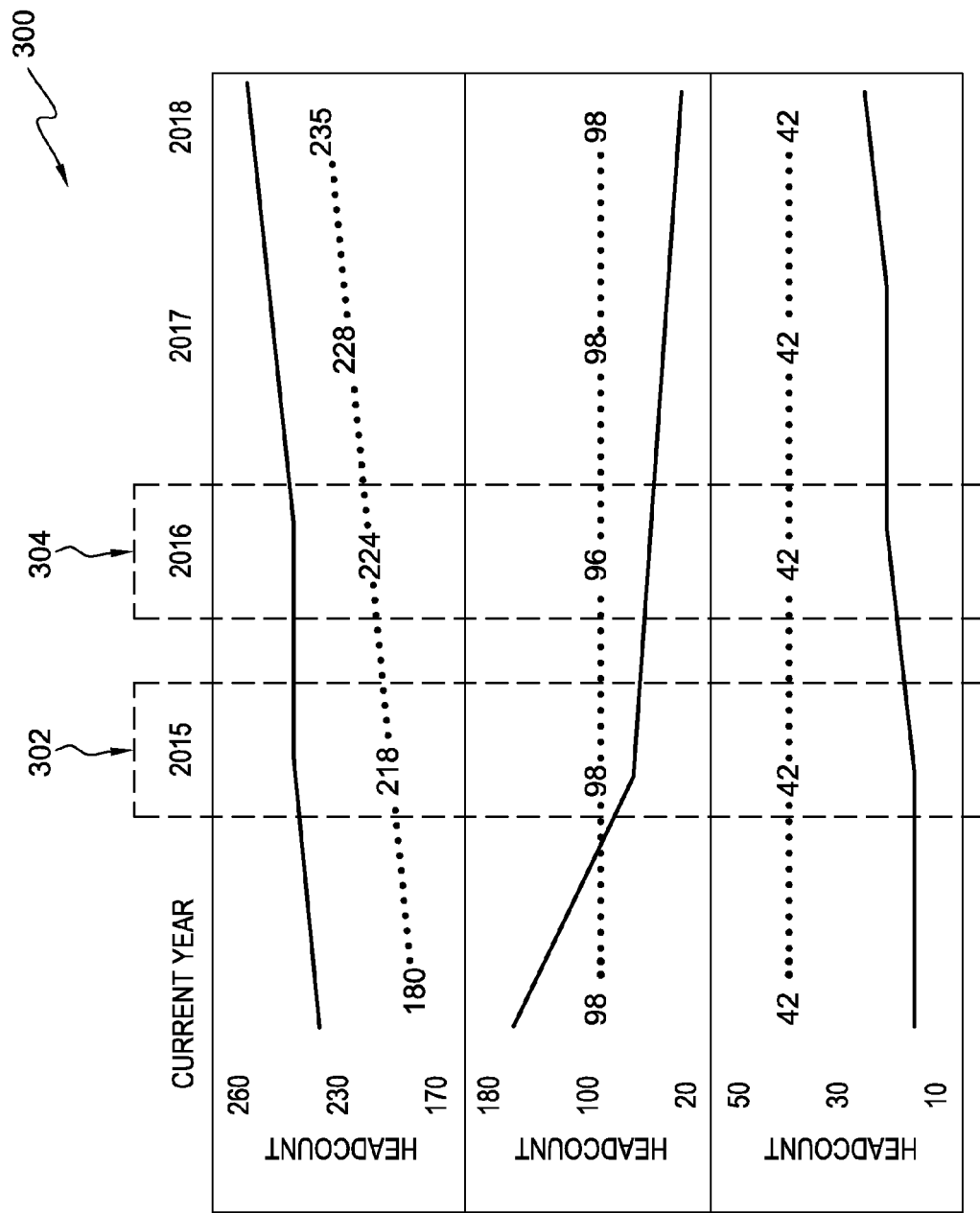
FIGS. 3A-3D illustrate examples of data displayed using the data overlay mechanism, on the client computing device within the distributed data processing environment of FIG. 1, in accordance with an embodiment of the present invention.

FIG. 3A depicts graph 300 as a data analysis application, such as data analysis application 106 or data analysis application 110, displays the graph before a user initiates data overlay mechanism 114. Graph 300 is an example graph that displays headcount data for three different divisions of a company across several years. Column 302 displays the headcount data for 2015. Column 304 displays the headcount data for 2016. Data points for additional years are also displayed. Graph 300 is depicted as a line graph. Data overlay mechanism 114 operates with a plurality of tabular and graph types, including, for example, line charts, bar charts, scatter plots, etc.

Figure 3B:
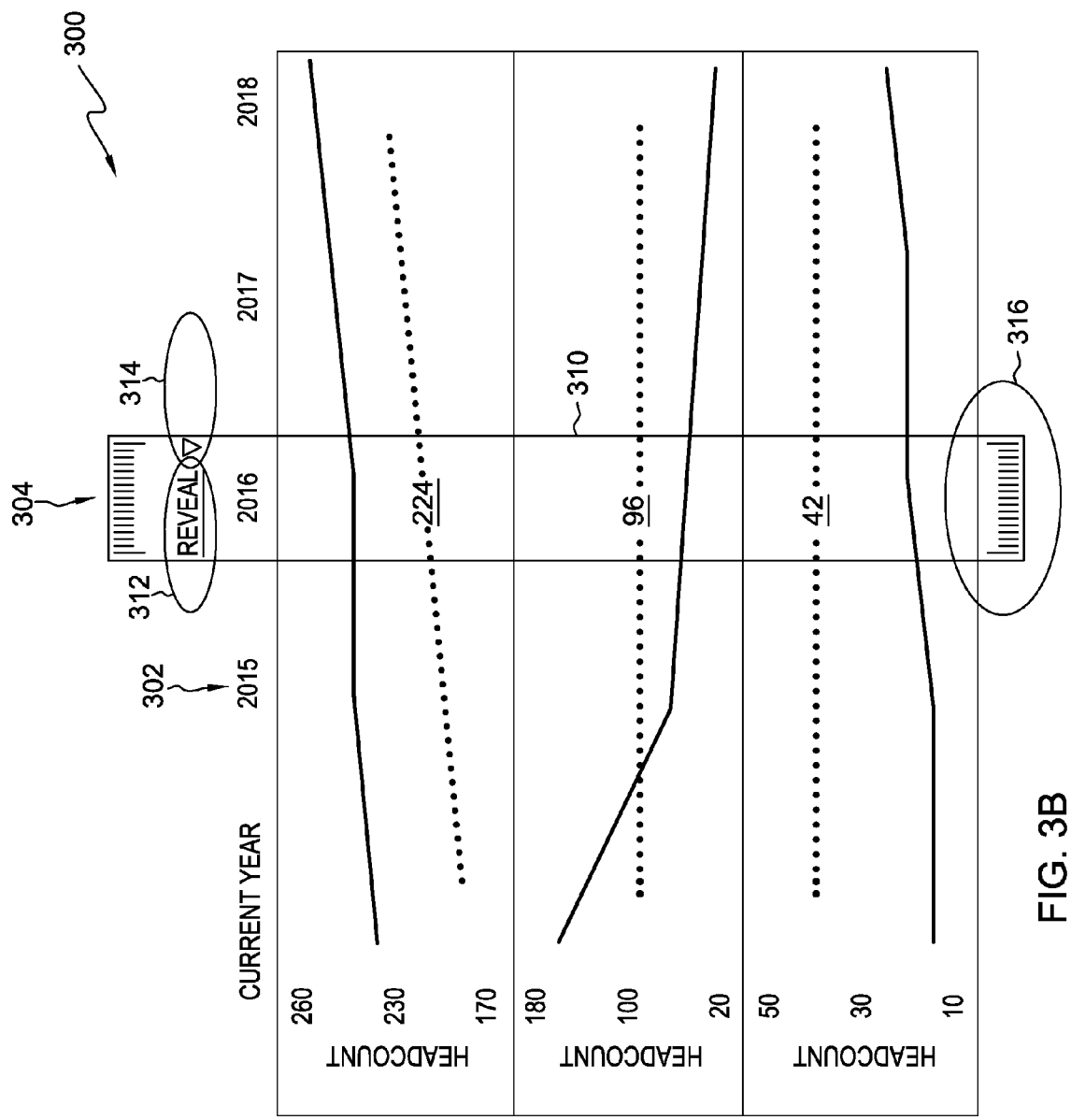

FIG. 3B depicts graph 300, as depicted in FIG. 3A, with an example of a widget associated with data overlay mechanism 114 shown. Widget 310 overlays the data points in column 304. Mode indicator 312 shows the current mode for data overlay mechanism 114. In the example, mode indicator 312 shows the current mode is "Reveal," thus the data points shown in FIG. 3B for column 304 are the same as the data points shown in FIG. 3A. Mode changer 314 is an indicator of a dropdown box. When a user clicks on mode changer 314, data overlay mechanism 114 displays a list of available modes. In one embodiment, in addition to a list of modes, mode changer 314 includes a window in which the user can type in a function, such as a formula. Size changer 316 enables a user to change the size of widget 310 to encompass more or less data columns by, for example, clicking and dragging the ends of the "ruler" markings within size changer 316. In another example, if client computing device 108 includes a touchscreen, a user may change the size of the widget by spreading or narrowing the widget with the user's fingers on the screen. In the depicted embodiment, data overlay mechanism 114 displays each data point in widget 310 with an underline, indicating that further drill down is available on the data. For example, a user may click or tap on an underlined data point, and data overlay mechanism 114 changes the displayed screen to a screen or tab within data analysis application 110 that includes the origin of the data point in graph 300.

Figure 3C:
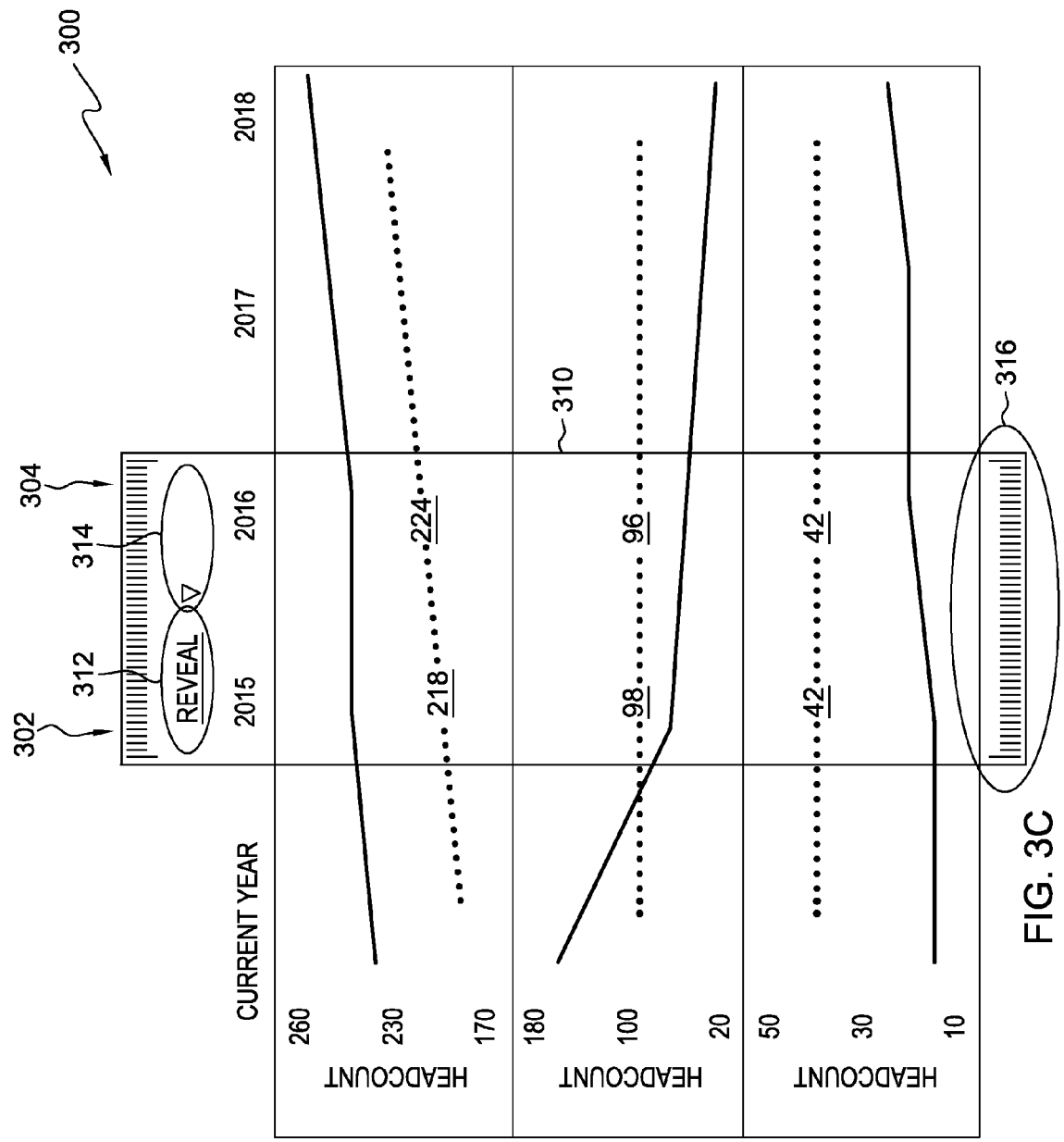

FIG. 3C depicts graph 300, as depicted in FIG. 3A, with an example of the widget associated with data overlay mechanism 114 shown. In FIG. 3C, widget 310 overlays the data points in column 302 and column 304. In the example, mode indicator 312 shows the current mode is "Reveal," thus the data points shown in FIG. 3C for both column 302 and column 304 are the same as the data points shown in FIG. 3A. Size changer 316 is larger, with respect to FIG. 3B, because the user widened widget 310 to include two columns of data.

Figure 3D:
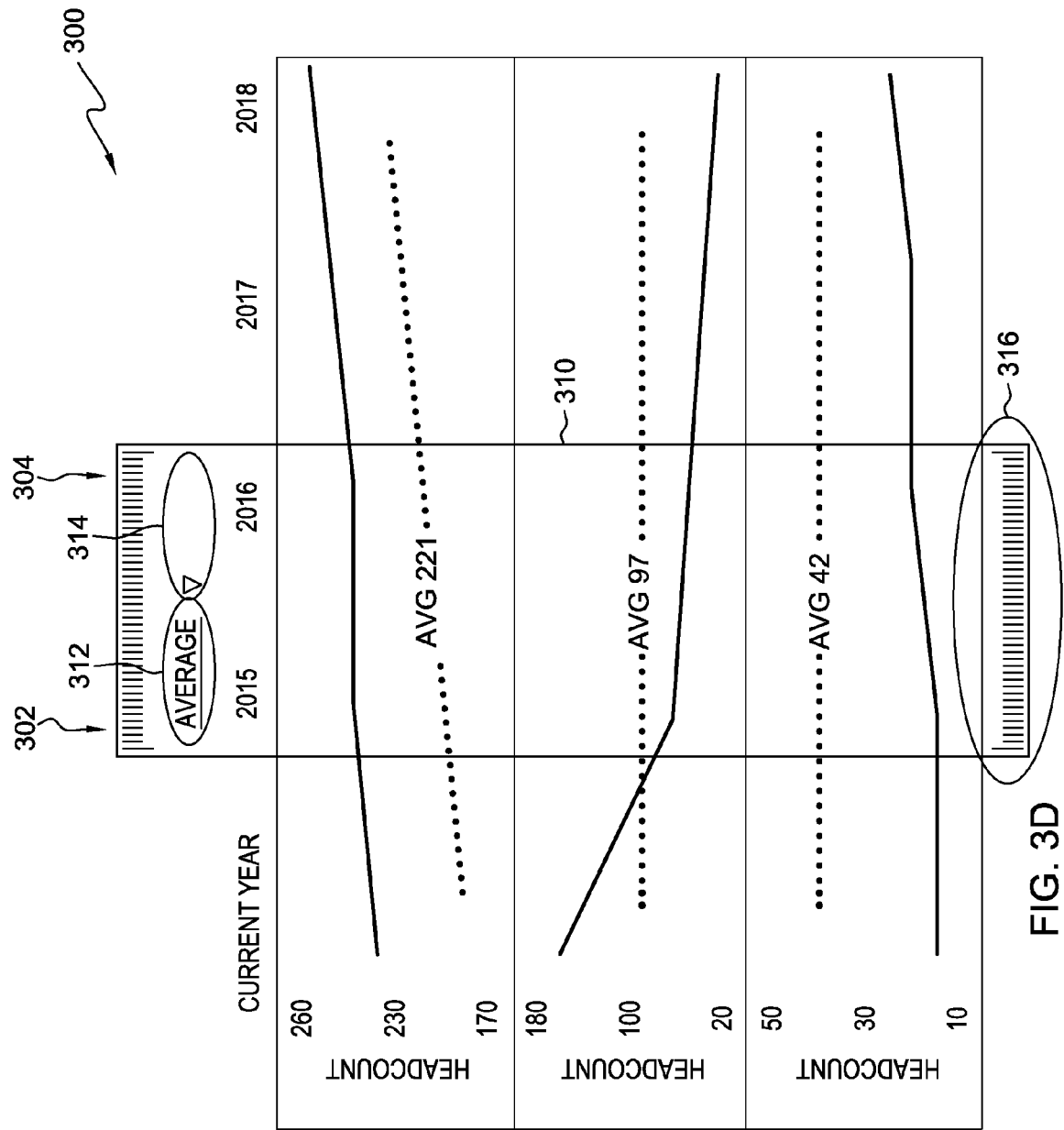

FIG. 3D is similar to FIG. 3C, however in the current example, mode indicator 312 shows the current mode is "Average," thus the data points which data overlay mechanism 114 displays, via widget 310, are the average of the data points which data overlay mechanism 114 displays in column 302 and column 304 of FIG. 3C. In the example, the data points are not underlined, as the average which data overlay mechanism 114 displays is the result of an applied analytic, and therefore no further drill down is available.

Figure 4:
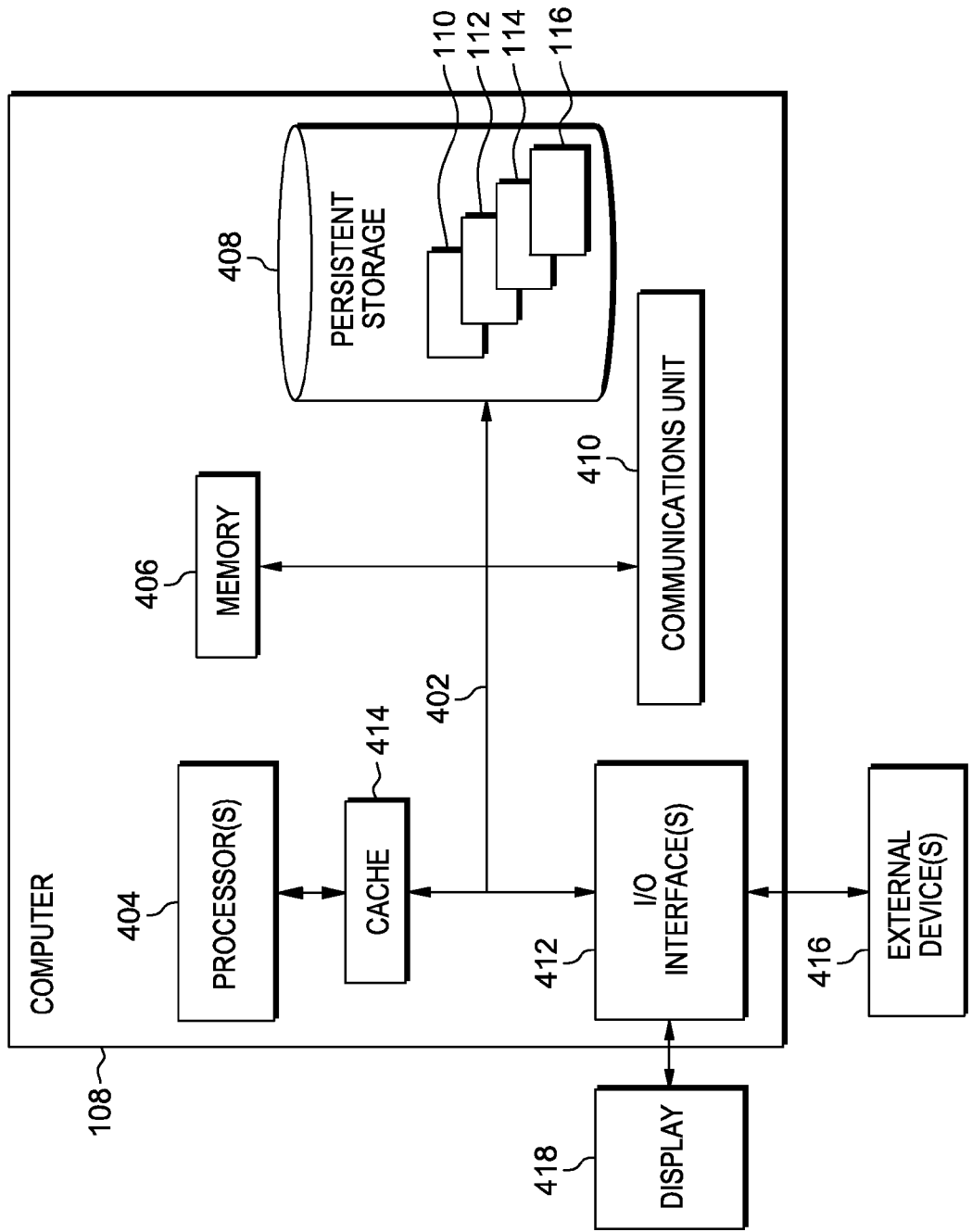
FIG. 4 depicts a block diagram of components of the client computing device executing the data overlay mechanism within the distributed data processing environment of FIG. 1, in accordance with an embodiment of the present invention.

FIG. 4 depicts a block diagram of components of client computing device 108, executing data overlay mechanism 114, within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 108 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., data analysis application 110, database 112, data overlay mechanism 114, and API 116 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 104. In these examples, communications unit 410 includes one or more network interface cards. Communications unit 410 may provide communications through the use of either or both physical and wireless communications links. Data analysis application 110, database 112, data overlay mechanism 114, and API 116 may be downloaded to persistent storage 408 through communications unit 410.

I/O interface(s) 412 allows for input and output of data with other devices that may be connected to client computing device 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention, e.g., data analysis application 110, database 112, data overlay mechanism 114, and API 116 can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for presenting a data interpretation viewport, the method comprising the steps of:

initializing, by one or more computer processors, an overlay on a graphical data display;

receiving, by the one or more computer processors, a plurality of coordinates of the overlay, wherein the plurality of coordinates indicate a position and a size of the overlay;

retrieving, by the one or more computer processors, one or more data points from the graphical data display;

de-emphasizing, by the one or more computer processors, the one or more retrieved data points that do not reside within the overlay, wherein de-emphasizing the one or more retrieved data points that do not reside within the overlay includes removing the one or more retrieved data points that do not reside within the overlay from view;

displaying, by the one or more computer processors, in the overlay, the one or more retrieved data points of the graphical data display that reside within the overlay;

performing, by the one or more computer processors, at least one mathematical function on the one or more retrieved data points that reside within the overlay; and displaying, by the one or more computer processors, in the overlay, data resulting from performing the at least one mathematical function.

2. The method of claim 1, further comprising, receiving, by the one or more computer processors, a mode selection from a user.

3. The method of claim 2, wherein a mode selection includes at least: revealing one or more of the retrieved data points that reside within the plurality of coordinates of the overlay, or performing one or more mathematical functions on the retrieved data points that reside within the plurality of coordinates of the overlay.

4. The method of claim 1, wherein the at least one mathematical function includes at least one of: an arithmetic operation, a formula, or an algorithm.

5. The method of claim 1, further comprising, receiving, by the one or more computer processors, another plurality of coordinates of the overlay, wherein the plurality of coordinates indicate another position and another size of the overlay.

6. The method of claim 1, wherein de-emphasizing the one or more retrieved data points that do not reside within the overlay includes dimming the one or more retrieved data points that do not reside within the overlay.

7. A computer program product for presenting a data interpretation viewport, the computer program product comprising:

one or more computer readable storage device and program instructions stored on the one or more computer readable storage device, the program instructions comprising:

program instructions to initialize an overlay on a graphical data display;

program instructions to receive a plurality of coordinates of the overlay, wherein the plurality of coordinates indicate a position and a size of the overlay;

program instructions to retrieve one or more data points from the graphical data display;

program instructions to de-emphasize the one or more retrieved data points that do not reside within the overlay, wherein program instructions to de-emphasize the one or more retrieved data points that do not reside within the overlay include removing the one or more retrieved data points that do not reside within the overlay from view;

program instructions to display, in the overlay, the one or more retrieved data points of the graphical data display that reside within the overlay;

program instructions to perform at least one mathematical function on the one or more retrieved data points that reside within the overlay; and program instructions to display, in the overlay, data resulting from performing the at least one mathematical function.

8. The computer program product of claim 7, further comprising, program instructions to receive a mode selection from a user.

9. The computer program product of claim 8, wherein a mode selection includes at least: revealing one or more of the retrieved data points that reside within the plurality of coordinates of the overlay, or performing one or more mathematical functions on the retrieved data points that reside within the plurality of coordinates of the overlay.

10. The computer program product of claim 7, wherein the at least one mathematical function includes at least one of: an arithmetic operation, a formula, or an algorithm.

11. The computer program product of claim 7, further comprising, program instructions to receive another plurality of coordinates of the overlay, wherein the plurality of coordinates indicate another position and another size of the overlay.

12. The computer program product of claim 7, wherein program instructions to de-emphasize the one or more retrieved data points that do not reside within the overlay includes program instructions to dim the one or more retrieved data points that do not reside within the overlay.

13. A computer system for presenting a data interpretation viewport, the computer system comprising:

one or more computer processors;

one or more computer readable storage device;

program instructions stored on the one or more computer readable storage device for execution by at least one of the one or more computer processors, the program instructions comprising:

program instructions to initialize an overlay on a graphical data display;

program instructions to receive a plurality of coordinates of the overlay, wherein the plurality of coordinates indicate a position and a size of the overlay;

program instructions to retrieve one or more data points from the graphical data display;

program instructions to de-emphasize the one or more retrieved data points that do not reside within the overlay, wherein program instructions to de-emphasize the one or more retrieved data points that do not reside within the overlay include removing the one or more retrieved data points that do not reside within the overlay from view;

program instructions to display, in the overlay, the one or more retrieved data points of the graphical data display that reside within the overlay;

program instructions to perform at least one mathematical function on the one or more retrieved data points that reside within the overlay; and program instructions to display, in the overlay, data resulting from performing the at least one mathematical function.

14. The computer system of claim 13, further comprising, program instructions to receive a mode selection from a user.

15. The computer system of claim 14, wherein a mode selection includes at least: revealing one or more of the retrieved data points that reside within the plurality of coordinates of the overlay, or performing one or more mathematical functions on the retrieved data points that reside within the plurality of coordinates of the overlay.

16. The computer system of claim 13, further comprising, program instructions to receive another plurality of coordinates of the overlay, wherein the plurality of coordinates indicate another position and another size of the overlay.

17. The computer system of claim 13, wherein program instructions to de-emphasize the one or more retrieved data points that do not reside within the overlay includes program instructions to dim the one or more retrieved data points that do not reside within the overlay.

\* \* \* \* \*